Dec. 13, 1960

A. BLANCHARD 2,964,730

ELECTRO-ACOUSTIC TRANSDUCER HAVING
COAXIALLY SPACED CYLINDRICAL COILS

Filed Feb. 25, 1955

INVENTOR.
ANDRE BLANCHARD.

BY Robert Hockfield

HIS ATTORNEY.

United States Patent Office 2,964,730
Patented Dec. 13, 1960

2,964,730

ELECTRO-ACOUSTIC TRANSDUCER HAVING COAXIALLY SPACED CYLINDRICAL COILS

Andre Blanchard, Houston, Tex., assignor, by mesne assignments, to Schlumberger Well Surveying Corporation, Houston, Tex., a corporation of Texas Filed Feb. 25, 1955, Ser. No. 490,500

8 Claims. (Cl. 340—12)

This invention relates to transducers, and more particularly, pertains to new and improved transducers for producing acoustic energy in response to applied electric energy.

In certain applications, such as in the generation of acoustic pulses employed in the determination of seismic velocities in wells, one or more transducers may be lowered in a well or borehole. Prior transducers used for this purpose are generally satisfactory at shallow depths; however, present techniques require that the transducers be operated at great depths and thus are subjected to extremely high static pressures of the drilling mud which usually fills a borehole. Under these conditions, prior devices may not always be effective to provide acoustic pulses of a desired intensity.

It is, therefore, an object of the present invention to provide a new and improved transducer adapted to operate efficiently under a variety of conditions.

Another object of the present invention is to provide a new and improved transducer which is effective to convert electric energy to acoustic energy although subjected to relatively high pressures.

A transducer in accordance with the present invention comprises a pair of annular conductors disposed in concentric, essentially coextensive relation to one another and individually having end portions. Means are provided for electrically connecting an end portion of one of the annular conductors to an adjacent end portion of the other of the annular conductors. Electrical energy is applied to the remaining of the end portions of the annular conductors thereby to cause the outer conductor to expand while the inner conductor contracts in response to the applied electrical energy.

The novel features of the present invention are set forth with particularity in the appended claims. The present invention, both as to its organization and manner of operation, together with further objects and advantages thereof, may best be understood by reference to the following description taken in connection with the accompanying drawing in which:

Figure 1:
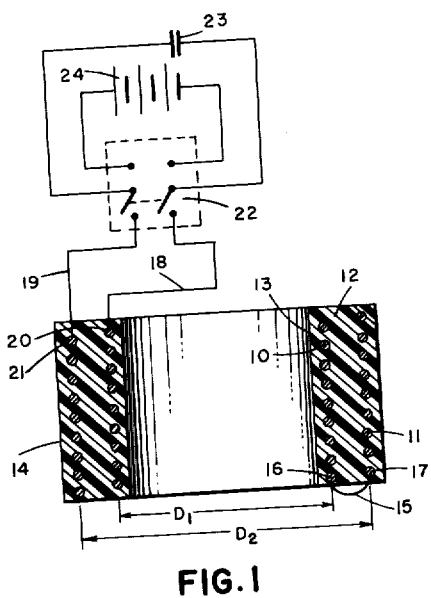
Fig. 1 is a view in longitudinal section of a transducer constructed in accordance with the invention shown in an electrical circuit adapted to energize the transducer.

As shown in Fig. 1 of the drawing, the transducer embodying the present invention comprises a first coil 10 of conductive material wound in a helix defining a first right cylinder having a given diameter, $D_1$. It further comprises a second coil 11 of conductive material wound in a helix defining a second right cylinder having a diameter, $D_2$, larger than diameter $D_1$. Coils 10 and 11 are disposed in concentric, essentially coextensive relation to one another so that coil 10 constitutes an inner coil and coil 11 an outer coil. The coils are imbedded in a non-magnetic material 12, which may, for example, be a solid plastic constituting a relatively rigid support for the coils. For example, the coils may be supported in the desired positions within a suitable mold and material 12 may be introduced in a liquid or plastic condition so that it fills any spaces between adjacent turns of each of coils 10 and 11 and between the coils themselves. Thereafter material 12 is permitted to solidify and the mold is removed to expose surfaces 13 and 14 which have the form of concentric cylinders aligned with the longitudinal axis of the coils 10 and 11.

An electrically conductive link 15 electrically connects adjacent end portions 16 and 17 of coils 10 and 11, and electrical conductors 18 and 19 are provided for applying electrical energy to the remaining end portions 20 and 21 of the coils. Conductors 18 and 19 are connected to an adjacent pair of fixed terminals of a double-pole, double-throw switch 22 having its movable contacts connected to a storage condenser 23 and its remaining fixed contacts connected to a charging battery 24.

Figure 2:
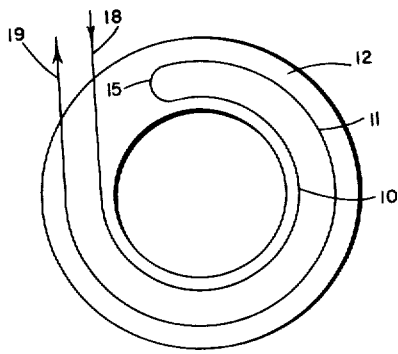
Fig. 2 is a simplified, end view of the transducer shown in Fig. 1.

By operating switch 22, condenser 23 may be connected to battery 24 to accumulate a charge and, thereafter, the condenser may be connected to leads 18 and 19 thereby causing a surge of current to flow through the coils 10 and 11 in opposite directions. The direction of current flow may be best appreciated by referring to Fig. 2 which illustrates that the coils are essentially of bifilar construction. Consequently, the current flowing through coil 10 is in the magnetic field produced by the current flowing in coil 11, while the current flowing in coil 11 is in the magnetic field produced by the current flowing in coil 10. Stated another way, the coils are energized in such a manner as to provide respective magnetic fields of opposite sense and the outer coil expands while the inner coil contracts. Thus, the coils 10 and 11 tend to separate in response to each surge of current and acoustic energy is derived.

Since the transducer includes coils connected in bifilar relationship, it presents a very low inductance to the source of electrical energy and the surge of current produced by the discharge of condenser 23 is of extremely high intensity and short duration. Thus, each time condenser 23 is discharged through coils 10 and 11, a sharp acoustic pulse of high amplitude is derived.

Because of the unique construction of the transducer embodying the present invention, as evident in Fig. 1, the external static pressure imposed on the transducer has little effect on its operating efficiency. This is understandable because the coils 10 and 11 are of cylindrical form and thus may be embedded in a material of cylindrical configuration. The support afforded by the imbedding material is relatively rugged and variations in static pressure produce relatively no change in the dimensional relationship between coils 10 and 11.

It is thus apparent that a transducer constructed in accordance with the present invention is not subject to the deficiencies of various prior art constructions.

Obviously, the size of conductors employed for the coils 10 and 11 should be selected so that they will be elastic enough to permit the required amount of expansion and contraction in the coils. If desired, stranded wires may be employed to facilitate deformation of the coils.

Figure 3:
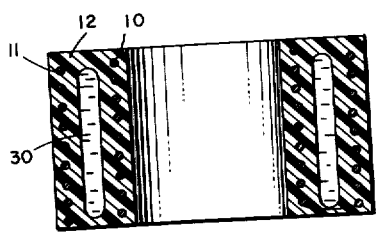
Figs. 3, 4 and 5 represent modifications which may be made to the transducer illustrated in Fig. 1.

In the alternative construction represented in Fig. 3, a space 30 in embedding material 12 is provided between the portions of the embedding material covering coils 10 and 11. This space may be filled with a suitable gas or a liquid and makes it easier for the coils to separate during operation.

Figure 4:
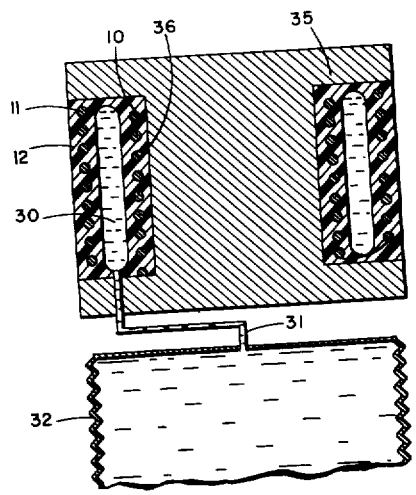

To increase the ability of the transducer embodying the present invention to withstand high static pressures, the construction illustrated in Fig. 4 may be employed.

In this modification, space 30 is connected by a tube 31 to a fluid-filled bellows or bag 32, which is exposed to the same pressure 35 as is the transducer. The static pressure causes a reduction in the size of bellows 32 until the pressure of the fluid inside the bellows, and thus inside space 30, is equal to the static pressure, for example, in the well in which the transducer is being used.

If it is desired that the deformation, required to realize this equalization of pressure within and without, be dependent upon the deformation of the bellows rather than on deformation of the transducer, the transducer itself may be constructed of heavier walls or a resilient material of suitable fluid permeability may be employed to fill space 30.

To cause the transducer to emit pulses radially relative to the outer surface of outer coil 11, a mandrel or support 35 of relatively rigid, non-magnetic material may be provided. Mandrel 35 has an annular groove 36 which closely conforms to the cylindrical configuration of the embedding material 12 and is mechanically connected to inner coil 10 by the embedding material.

Figure 5:
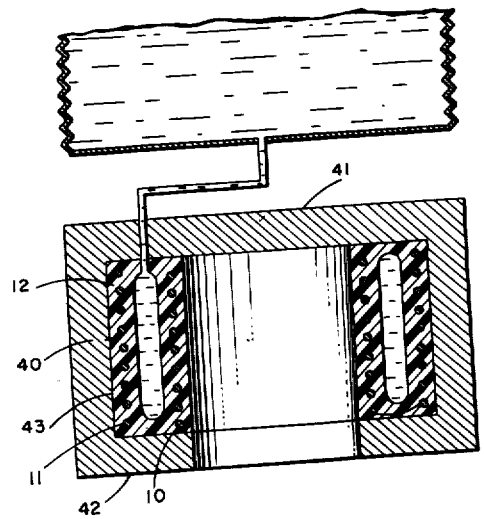

If it is desired to emit pulses axially relative to the transducer, the modification of Fig. 5 may be employed which includes a support 40 of relatively rigid, non-magnetic material having a hollow, cylindrical configuration. Support 40 includes an end closure 41 and an opposite end portion 42 of ring-like configuration thereby to define an annular space 43 which closely conforms to the cylindrical configuration of support material 12. The support 40 is effectively connected to outer coil 11 by the embedding material.

Although the transducer embodying the present invention has been described in connection with the transmission of acoustic energy, it obviously may be employed as a receiver; i.e., the theorem of reciprocity is deemed to be applicable. Accordingly, it is within the scope of the present invention to include the application of electric energy to effect transmission as well as to include reception in which acoustic energy produces an electrical signal.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. An electro-acoustic transducer comprising a first coil of conductive material wound in a helix defining a first right cylinder having a given diameter, a second coil of conductive material wound in a helix defining a second right cylinder having a diameter other than said given diameter, said first and said second coils being disposed in coaxial, essentially coextensive relation to one another the difference between said diameters being such that there is a spacing defined between said right cylinders, a relatively stiff non-magnetic material embedding said first and second coils, filling any spaces between adjacent turns of each of said coils and having portions between said first and said second coils spacing said coils from one another and said material further having surfaces in the form of concentric cylinders aligned with the longitudinal axis of at least one of said coils, and means for energizing said first and said second coils to provide respective magnetic fields of opposite sense.

2. An electro-acoustic transducer according to claim 1 wherein said non-magnetic material has an annular cavity in the spacing intermediate said first and said second coils, and wherein said transducer further comprises a pressure-sensitive container in fluid comunication with said annular cavity in said non-magnetic materials and a fluid received by said annular cavity and said container.

3. An electro-acoustic transducer comprising: a first conductor wound in a helix to define a first right cylinder having a first diameter, a second conductor wound in a helix to define a second right cylinder having a second diameter, said second diameter being larger than said first diameter, said right cylinders being disposed in coaxial essentially coextensive relation to one another, the difference between said diameters being such that an annular space is defined between said right cylinders, a relatively stiff non-magnetic material embedding said first and second conductors and having portions spacing said first cylinder from said second cylinder, and means for electrically connecting an end portion of one of said conductors to an adjacent end portion of the other of said conductors so that a large amount of electrical energy may be applied to the remaining end portions to cause the portions of said conductors forming right cylinders to move relative to one another in a radial direction thereby to vary the spacing between said cylinders.

4. An electro-acoustic transducer comprising: a first conductor wound in a helix to define a first right cylinder having a first diameter; a second conductor wound in a helix to define a second right cylinder having a second diameter, said second diameter being larger than said first diameter, said right cylinders being disposed in coaxial essentially-coextensive relation to one another, the difference between said diameters being such that an annular space is defined between said right cylinders, a relatively stiff nonmagnetic material embedding said first and second conductors and having portions spacing said first cylinder from said second cylinder; means for electrically connecting an end portion of one of said conductors to an adjacent end portion of the other of said conductors; and a source of electrical energy coupled to the remaining end portions of said conductors so that a large amount of electrical energy may be applied to the remaining end portions to cause the portions of said conductors forming right cylinders to move relative to one another in a radial direction thereby to vary the spacing between said cylinders.

5. The device as claimed in claim 3 wherein said nonmagnetic material includes portions forming a solid cylindrical core of relatively stiff nonmagnetic material extending through said first right cylinder.

6. The device as claimed in claim 3 wherein said nonmagnetic material includes portions forming an outer annular casing of relatively stiff, nonmagnetic material about said second right cylinder and has a central bore of lesser diameter than said first diameter.

7. The device as claimed in claim 6 wherein said annular casing also is provided with at least one cylindrical end closure thereby enclosing one end of said central bore.

8. The device as claimed in claim 1 wherein said material has portions extending into said spacing and defining an annular cavity intermediate said first and second cylinders and a fluid received by said annular cavity.

References Cited in the file of this patent

UNITED STATES PATENTS

| | | |
|---|---|---|
| 1,451,880 | Lightfoot | Apr. 17, 1923 |
| 2,160,007 | Turner | May 30, 1939 |
| 2,355,680 | Ruben | Aug. 15, 1944 |
| 2,398,587 | McLellan | Apr. 16, 1946 |
| 2,429,104 | Olson | Oct. 14, 1947 |
| 2,648,837 | Mounce | Aug. 11, 1953 |
| 2,712,124 | Ording | June 28, 1955 |
| 2,749,532 | Harris | June 5, 1956 |
| 2,776,416 | Harris | Jan. 1, 1957 |